United States Patent
Khandekar et al.

(10) Patent No.: US 8,693,407 B2
(45) Date of Patent: Apr. 8, 2014

(54) METHOD AND APPARATUS FOR KEEP-ALIVE BITS TRANSMISSION

(75) Inventors: Aamod Khandekar, San Diego, CA (US); Alexei Gorokhov, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 952 days.

(21) Appl. No.: 11/852,449

(22) Filed: Sep. 10, 2007

(65) Prior Publication Data

US 2008/0130560 A1 Jun. 5, 2008

Related U.S. Application Data

(60) Provisional application No. 60/843,847, filed on Sep. 11, 2006.

(51) Int. Cl.
*H04W 4/00* (2009.01)
*H04W 72/00* (2009.01)

(52) U.S. Cl.
USPC ............ 370/329; 370/312; 455/450; 455/509

(58) Field of Classification Search
None
See application file for complete search history.

(56) References Cited

U.S. PATENT DOCUMENTS

| | | | |
|---|---|---|---|
| 6,212,175 B1 | 4/2001 | Harsch | |
| 7,426,569 B2 | 9/2008 | Dunk | |
| 2003/0128676 A1 | 7/2003 | Lee | |
| 2004/0246983 A1* | 12/2004 | Kaatz | 370/432 |
| 2006/0002292 A1* | 1/2006 | Chang et al. | 370/225 |
| 2006/0084475 A1* | 4/2006 | Ohkubo et al. | 455/562.1 |
| 2006/0187864 A1* | 8/2006 | Wang et al. | 370/311 |
| 2006/0193315 A1* | 8/2006 | Sinivaara et al. | 370/389 |
| 2007/0053315 A1* | 3/2007 | Sugaya | 370/318 |
| 2007/0242634 A1 | 10/2007 | Calcev et al. | |
| 2007/0248034 A1* | 10/2007 | Hsu et al. | 370/318 |
| 2007/0271568 A1 | 11/2007 | Gorokhov | |
| 2008/0025337 A1* | 1/2008 | Smith et al. | 370/439 |
| 2010/0067428 A1* | 3/2010 | Cordeiro et al. | 370/315 |

FOREIGN PATENT DOCUMENTS

| | | |
|---|---|---|
| CN | 1658558 A | 8/2005 |
| CN | 1816992 A | 8/2006 |
| JP | 2003174458 A | 6/2003 |
| JP | 2007528662 A | 10/2007 |

(Continued)

OTHER PUBLICATIONS

International Preliminary Report on Patentability, PCT/US2007/078116—The International Bureau of WIPO—Geneva, Switzerland, Mar. 17, 2009.

(Continued)

*Primary Examiner* — Marcus R Smith
(74) *Attorney, Agent, or Firm* — Charles E. Eggers

(57) ABSTRACT

Systems and methodologies are described that provide techniques for managing persistent resource assignments in a wireless communication system. An access point can generate a bitmap by mapping access terminals having persistent assignments for traffic channels to a series of bitmap bits that provide keep-alive indications for the access terminals. The bitmap can then be provided as a common keep-alive message in a broadcast or multicast transmission to the access terminals. The keep-alive message can further include CRC bits for error prevention. An access terminal, upon receiving the keep-alive message, can then determine whether a bitmap bit in the keep-alive message corresponding to the access terminal conveys a keep-alive indication for the terminal and utilize its persistently assigned traffic channels accordingly.

15 Claims, 13 Drawing Sheets

(56) References Cited

FOREIGN PATENT DOCUMENTS

| RU | 2145775 | 2/2000 |
| TW | 200620877 | 6/2006 |
| TW | 200623683 | 7/2006 |
| WO | WO0137451 | 5/2001 |
| WO | WO2004032381 | 4/2004 |
| WO | WO2005088886 A1 | 9/2005 |

OTHER PUBLICATIONS

International Search Report—PCT/US2007/078116, International Search Authority—European Patent Office—May 9, 2008.
Written Opinion—PCT/US2007/078116, International Search Report—Euroepan Patent Office—May 9, 2008.
Aart van Halteren et al., Mobile Service Platform: A Middleware for Nomadic Mobile Service Provisioning, Jun. 2006.
Taiwan Search Report—TW096133914—TIPO—Aug. 17, 2011.

* cited by examiner

METHOD AND APPARATUS FOR KEEP-ALIVE BITS TRANSMISSION

CROSS-REFERENCE

This application claims the benefit of U.S. Provisional Application Ser. No. 60/843,847, filed Sep. 11, 2006, and entitled "A METHOD AND APPARATUS FOR KEEP-ALIVE BITS TRANSMISSION," the entirety of which is incorporated herein by reference.

BACKGROUND

I. Field

The present disclosure relates generally to wireless communications, and more specifically to techniques for managing resource assignments in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Multiple-access communication systems typically employ methods of assigning system resources to individual users in the system. Resource assignments can be given a predetermined duration in time or made persistent or "sticky" such that they do not have a set time for expiration. Persistent resource assignments can be used, for example, in voice applications or other wireless communication applications where periods of data packet transmission to a receiver are interspersed with periods where no data packets are transmitted to the receiver. However, in such applications, a receiver using a persistent assignment of resources may not be readily able to determine when a data packet is being transmitted. This inability to determine periods of data packet transmission can lead to reduced inefficiency of the receiver in decoding packets.

To mitigate the difficulties experienced by receivers utilizing persistent assignments of resources, an access point that transmits data packets to such receivers can manage the assignments by communicating keep-alive messages to the receivers. Keep-alive messages communicated by an access point can indicate whether a data packet is being transmitted, and from this information a receiver can receive and decode a data packet if one has been transmitted or wait and hold the persistent assignment if one has not been transmitted. However, when the number of receivers in the system having persistent resource assignments is large, the required system overhead for transmitting keep-alive messages to each receiver can become significant. Consequently, the required overhead for managing persistent resource assignments in a wireless communication system can adversely impact the performance of the system.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

According to an aspect, a method for providing a keep-alive message in a wireless communication system is described herein. The method can comprise generating a bitmap that maps one or more traffic channels utilized by respective terminals subject to persistent assignments thereof to respective bitmap bits that provide keep-alive indications to the terminals. In addition, the method can include constructing a keep-alive message, the keep-alive message comprises the bitmap. The method can further comprise transmitting the keep-alive message to the terminals in a multicast transmission.

Another aspect relates to a wireless communications apparatus that can comprise a memory that stores data relating to a bitmap keep-alive message, the bitmap keep-alive message comprising one or more bits mapped to respective data channels subject to persistent assignments to one or more access terminals. The wireless communications apparatus can also include a processor configured to transmit the bitmap keep-alive message to the respective access terminals in a transmission selected from the group consisting of a multicast transmission and a broadcast transmission.

Yet another aspect relates to an apparatus that facilitates management of sticky resource assignments in a wireless communication system. The apparatus can include means for constructing a keep-alive message using one or more bitmap bits corresponding to respective traffic channels for which one or more terminals have sticky assignments and one or more CRC bits. The apparatus can additionally include means for multicasting the keep-alive message to the terminals.

Still another aspect relates to a computer-readable medium that can comprise code for causing a computer to generate a bitmap that maps one or more traffic channels persistently assigned to respective mobile terminals to respective keep-alive bits. The computer-readable medium can further include code for causing a computer to construct a keep-alive signal using the keep-alive bits and one or more CRC bits and code for causing a computer to communicate the keep-alive signal to the mobile terminals in a multicast or broadcast transmission.

According to another aspect, an integrated circuit is described herein that can execute computer-executable instructions for providing keep-alive indications for mobile users in a wireless communication system. These instructions can include generating keep-alive information for respective mobile users, the keep-alive information provides a keep-alive indication or an indication of a present data transmission for the respective mobile users. The instructions can additionally comprise creating a signal, the signal comprising the keep-alive information and one or more error prevention measures. Further, the instructions can comprise communicating the signal to the mobile users in a multicast transmission.

According to yet another aspect, a method for communicating in a wireless communication system based on a persistent assignment of resources is described herein. The method can comprise receiving a multicast bitmap signal relating to a persistent assignment for one or more presently utilized traffic channels, the multicast bitmap signal comprising one or more bitmap bits corresponding to respective traffic channels. The method can further comprise retrieving a bitmap bit in the bitmap signal corresponding to a presently utilized traffic channel.

Another aspect described herein relates to a wireless communications apparatus that can include a memory that stores data relating to a persistently assigned traffic channel and a bitmap keep-alive message, the bitmap keep-alive message comprising one or more bits that correspond to respective traffic channels. In addition, the wireless communications apparatus can comprise a processor configured to determine whether a bit in the bitmap keep-alive message corresponding to the persistently assigned traffic channel contains a keep-alive indication.

Yet another aspect relates to an apparatus that facilitates wireless communication according to a sticky assignment of resources. The apparatus can comprise means for receiving a keep-alive message comprising one or more bitmap bits corresponding to respective traffic channels and one or more CRC bits. In addition, the apparatus can include means for determining whether a bitmap bit in the keep-alive message corresponding to a traffic channel being presently utilized according to a sticky assignment conveys a keep-alive indication. Further, the apparatus can comprise means for receiving data on the traffic channel upon determining that a keep-alive indication has not been conveyed.

Still another aspect relates to a computer-readable medium that can comprise code for causing a computer to receive information relating to a persistent assignment for a traffic channel. The computer-readable medium can further include code for causing a computer to receive information relating to a multicast or broadcast bitmap signal. In addition, the computer-readable medium can comprise code for causing a computer to determine whether the bitmap signal includes a keep-alive indication for the traffic channel. The computer-readable medium can additionally comprise code for causing a computer, upon a positive determination, to wait for a subsequent multicast or broadcast bitmap signal. Further, the computer-readable medium can comprise code for causing a computer, upon a negative determination, to attempt to receive one or more data packets on the traffic channel.

A further aspect described herein relates to an integrated circuit that can execute computer-executable instructions for utilizing keep-alive indications in a wireless communication system. These instructions can comprise receiving a keep-alive message from an access point, the keep-alive message contains keep-alive information relating to a presently utilized traffic channel. Further, the instructions can comprise determining whether the keep-alive information relating to the presently utilized traffic channel conveys a keep-alive indication. The instructions can additionally comprise at least one of receiving a data packet on the presently utilized traffic channel and continuing use of the presently utilized traffic channel pending a subsequent keep-alive message based on the determination.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
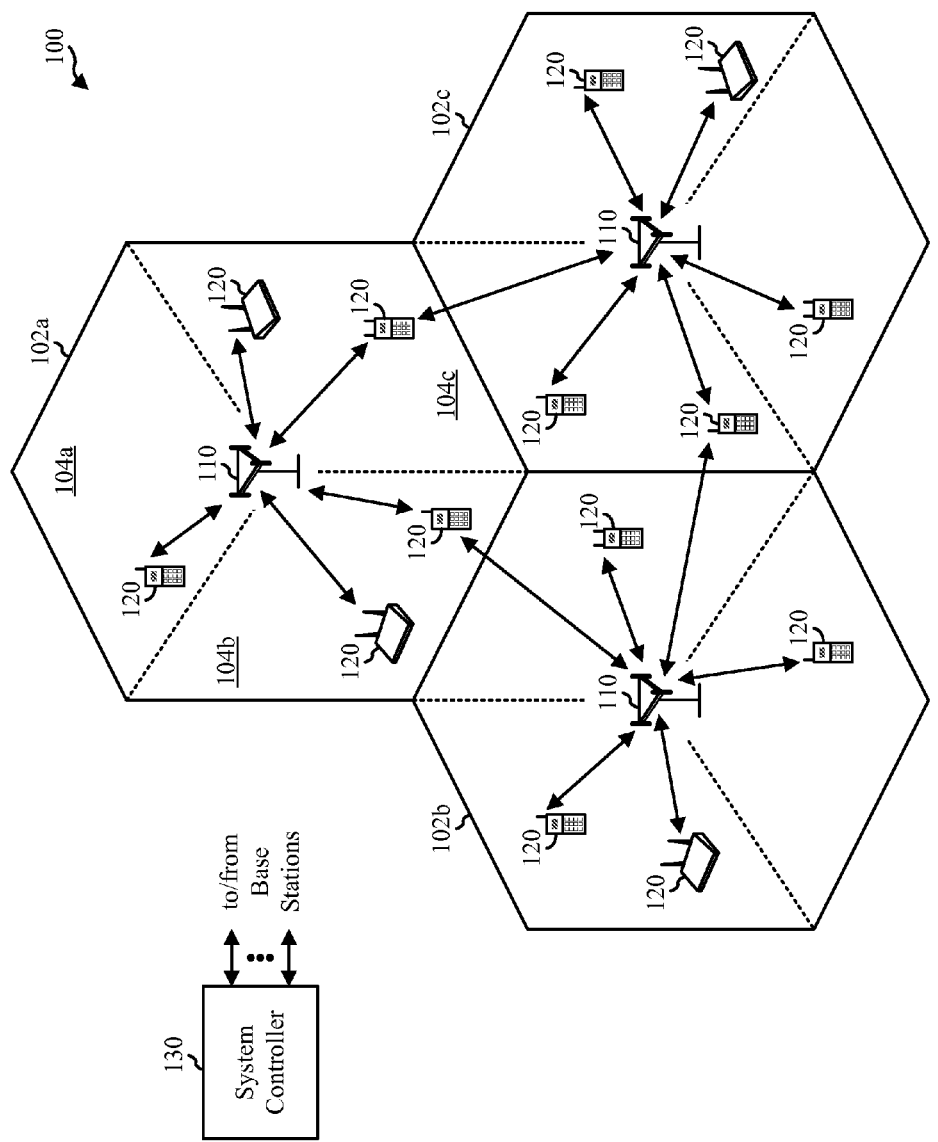
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used. In accordance with one aspect, each terminal 120 in system 100 can communicate with one or more base stations 110 via transmissions on forward and reverse links. The forward link (or downlink) refers to the communication link from the base stations 110 to the terminals 120, and the reverse link (or uplink) refers to the communication link from the terminals 120 to the base stations 110.

To improve system capacity, the coverage area 102 corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. In one example, sectors 104 in a cell 102 can be formed by groups of antennas (not shown) at base station 110, where each group of antennas is responsible for communication with terminals 120 in a portion of the cell 102. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. While the following description generally relates to a system in which each terminal communicates with one access point for simplicity, it should be appreciated that terminals can communicate with any number of access points.

In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In one example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, ... ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

In accordance with one aspect, system 100 can employ centralized scheduling via one or more schedulers implemented at, for example, system controller 130 and/or each base station 110. In a system utilizing centralized scheduling, scheduler(s) can rely on feedback from terminals 120 to make appropriate scheduling decisions. In one example, this feedback can include power amplifier (PA) headroom feedback in order to allow the scheduler to estimate a supportable reverse link peak rate for a terminal 120 from which such feedback is received and to allocate system bandwidth accordingly.

Figure 2:
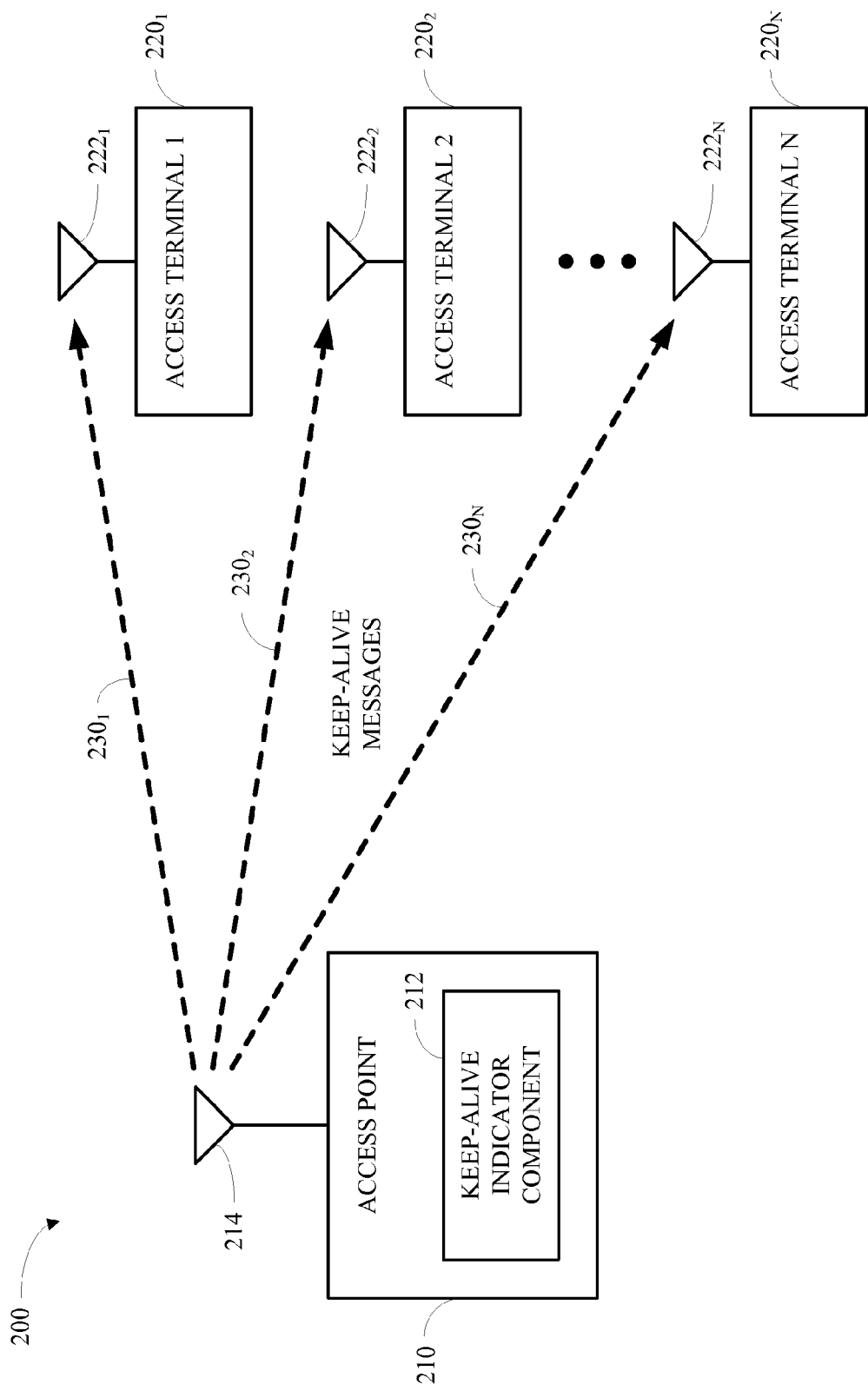
FIG. 2 is a block diagram of a system for managing persistent resource assignments in accordance with various aspects.

FIG. 2 is a block diagram of a system 200 for managing persistent resource assignments in accordance with various aspects described herein. In one example, system 200 includes an access point 210 that can communicate with one or more access terminals 220 on forward and reverse links via respective antennas 214 and 222. While only one antenna is illustrated at access point 210 and access terminals 220, it should be appreciated that access point 210 and access terminals 220 can include any number of antennas for communication with other access points, access terminals, and/or other entities in system 200. In addition, while only one access point 210 is shown in system 200 for brevity, it should be appreciated that system 200 can have any number of access points 210 in communication with access terminals 220.

Communication between access point 210 and access terminals 220 can include traffic data and/or control signaling, which can be encapsulated in packets prior to transmission or sent in any other appropriate manner. In one example, data and/or signaling can be communicated between access point 210 and access terminals 220 on one or more frequency selective channels. For example, data can be transmitted on one or more dedicated data channels, and signaling can be transmitted on one or more dedicated control channels. Alternatively, data and signaling can be communicated on common channels. Further, access terminals 220 can be assigned one or more data channels and one or more control channels for communication in system 200. Data and/or control channels can be uniquely assigned to terminals 220, or alternatively channels can be shared between access terminals 220.

In accordance with one aspect, access point 210 and access terminals 220 can communicate using subcarriers, subbands, and/or other communication resources assigned to respective access terminals 220 by access point 210 and/or another entity in system 200. Further, such assignments of communication resources can be made persistent or "sticky" such that they do not have a predetermined duration or time for expiration. Such assignments can be useful, for example, in Voice over Internet Protocol (VoIP) applications and/or other applications that involve non-continuous communication of small, latency-sensitive traffic packets, where communication of resource assignments for a large number of VoIP or other users is impractical. However, in such applications, an access terminal 220 using a persistent assignment may have difficulty determining when transmission of data packets begins after a period of silence. While techniques exist for such determinations by access terminals 220, these techniques are often not suitable for latency-sensitive applications due to their complexity.

In accordance with another aspect, to mitigate these difficulties, access point 210 can transmit respective keep-alive messages 230 to access terminals 220 to indicate whether data is being transmitted to the access terminals 220. In one example, keep-alive messages 230 can be generated by a keep-alive indicator component 212 at access point 210. Keep-alive messages 230 generated by keep-alive indicator component 212 and transmitted to access terminals 220 can be, for example, predetermined pseudorandom erasure sequences transmitted in place of data when no data is present to transmit to an access terminal 220. Accordingly, an access terminal 220, upon determining that a transmission includes an erasure sequence, can discard the transmission and wait for the next forward link transmission from access point 210.

However, when the number of access terminals 220 in a system utilizing persistent resource assignments is large, the power overhead required for transmitting keep-alive messages 230 to each access terminal 220 can become a significant portion of the total power used by access point 210. In one example, to reduce the amount of power needed for transmission of keep-alive messages 230, access point 210 can utilize a common keep-alive message 230 for multiple access terminals 220 having persistent resource assignments with access point 210. This common keep-alive message 230 can then be communicated to the access terminals 220 in a multicast or broadcast transmission. A common keep-alive message 230 can be transmitted on a forward link shared control channel (e.g., F-SCCH) and/or by any other appropriate means.

In accordance with one aspect, a multicast or broadcast keep-alive message 230 can be generated in the form of a bitmap. A bitmap keep-alive message 230 can be generated by mapping respective data channels that are persistently assigned to access terminals 220 to bits in the keep-alive message 230. Bits generated for a bitmap keep-alive message 230 can indicate, for example, whether data packets are buffered for communication on their corresponding data channels. The generated keep-alive message 230 can then be sent to access terminals 220, which can determine whether to attempt to detect a data packet on respective data channels assigned to the access terminals 220 based on the value of the corresponding bits in the bitmap message 230.

In another example, keep-alive indicator component 212 can also be operable to perform power control on a multicast or broadcast keep-alive message 230. For example, keep-alive indicator component 212 can instruct transmission of a keep-alive message 230 to access terminals 220 using a transmit power that is appropriate to allow an access terminal 220 having a lowest signal quality (e.g., in terms of carrier-to-interference ratio, etc.) to successfully receive and utilize the keep-alive message 230.

Figure 3:
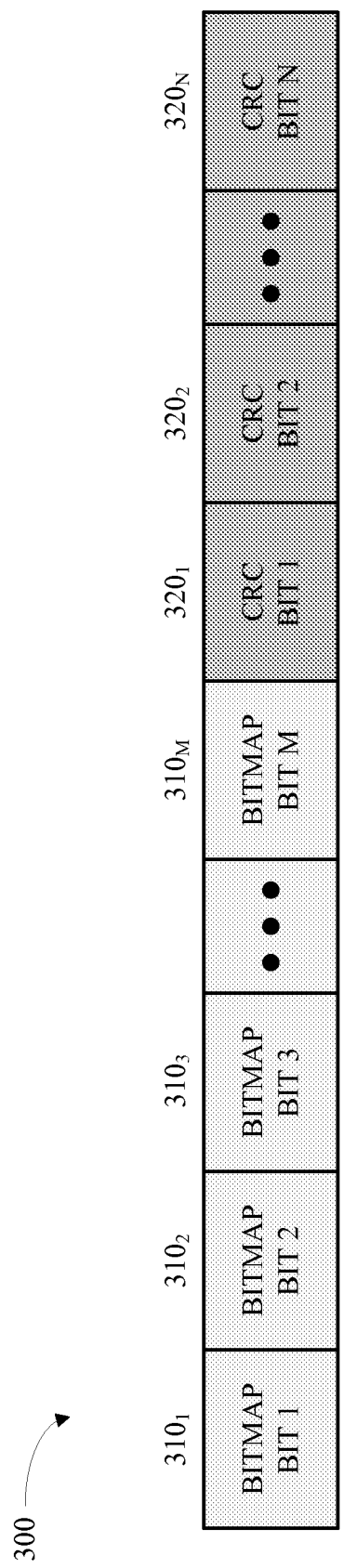
FIG. 3 illustrates an example bitmap structure for a keep-alive transmission in accordance with various aspects.

FIG. 3 illustrates an example bitmap structure 300 for a keep-alive transmission (e.g., a keep-alive message 230) in accordance with various aspects. In accordance with one aspect, bitmap structure 300 can include one or more bitmap bits 310 for providing keep-alive indications to mobile users (e.g., access terminals 220) having persistent resource assignments. Structure 300 can further include one or more cyclic redundancy check (CRC) bits 320 for error prevention. While structure 300 illustrates a series of bitmap bits 310 followed by a series of CRC bits 320, it should be appreciated that bitmap bits 310 and CRC bits 320 can appear in structure 300 in any order and/or grouping. Further, it should be appreciated that structure 300 can have any number of bitmap bits 310 and/or CRC bits 320.

In one example, bitmap bits 310 in structure 300 can be mapped to respective traffic channels used for communication by mobile users. The traffic channels utilized by the mobile users can be based on, for example, persistent resource assignments for the mobile users. By way of specific, non-limiting example, structure 300 can be used in connection with a VoIP application, and bitmap bits 310 can correspond to voice channels used by VoIP receivers. It should be appreciated that mobile users can be assigned one traffic channel or multiple traffic channels and that traffic channels can be shared between mobile users.

In accordance with one aspect, bitmap bits 310 in structure 300 can be mapped to traffic channels to manage persistent assignments of the traffic channels to mobile terminals. In one example, bitmap bits 310 can provide keep-alive indications for the traffic channels to facilitate their efficient use. For example, a bitmap bit 310 corresponding to a traffic channel can provide a keep-alive indication when a forward link data buffer for the channel is empty and, consequently, no data is to be transmitted on the channel during a given time period. Bitmap bits 310 can then be communicated as part of structure 300 to mobile users in a broadcast or multicast transmission. Upon receiving a transmission that includes structure 300, the mobile users can check the value of bitmap bit(s) 310 corresponding to data channel(s) assigned to the mobile user in order to determine whether the bitmap bit(s) 310 provides a keep-alive indication. In one example, if the bitmap bit(s) reflects a keep-alive indication, the mobile user can hold its current resource assignment and wait for a subsequent transmission of a structure 300. Otherwise, the mobile user can assume that data has been transmitted and can attempt to decode one or more transmitted traffic packets.

In another example, bitmap bits 310 in structure 300 can be mapped to multiple traffic channels utilized by one or more mobile users. For example, a single bitmap bit 310 can be used to correspond to multiple contiguous nodes on a channel tree. By mapping multiple channels to a common bitmap bit 310, a tradeoff can be achieved between required bitmap size and resource management flexibility.

In accordance with another aspect, CRC bits 320 can be employed in structure 300 to provide error checking capability for transmitted messages that include structure 300. In one example, CRC bits 320 can form a sequence that must be correctly received and decoded by a mobile terminal before bitmap bits 310 in the structure 300 may be utilized by the terminal. By utilizing CRC bits 320, the probability that a keep-alive indication will be falsely detected can be reduced to approximately $2^{-CRClength}$, where CRClength is the number of CRC bits 320 in structure 300.

While it can be observed that adding CRC bits 320 to structure 300 creates extra overhead for messages sent using structure 300, it should be appreciated that structure 300 allows the multicast and/or broadcast transmission of a common message to multiple idling mobile users. As a result, the required amount of communication resources for transmitting structure 300 can be made comparatively small as compared to unicast transmission of a separate message to each individual user when the number of users in the system is sufficiently large.

Figure 4:
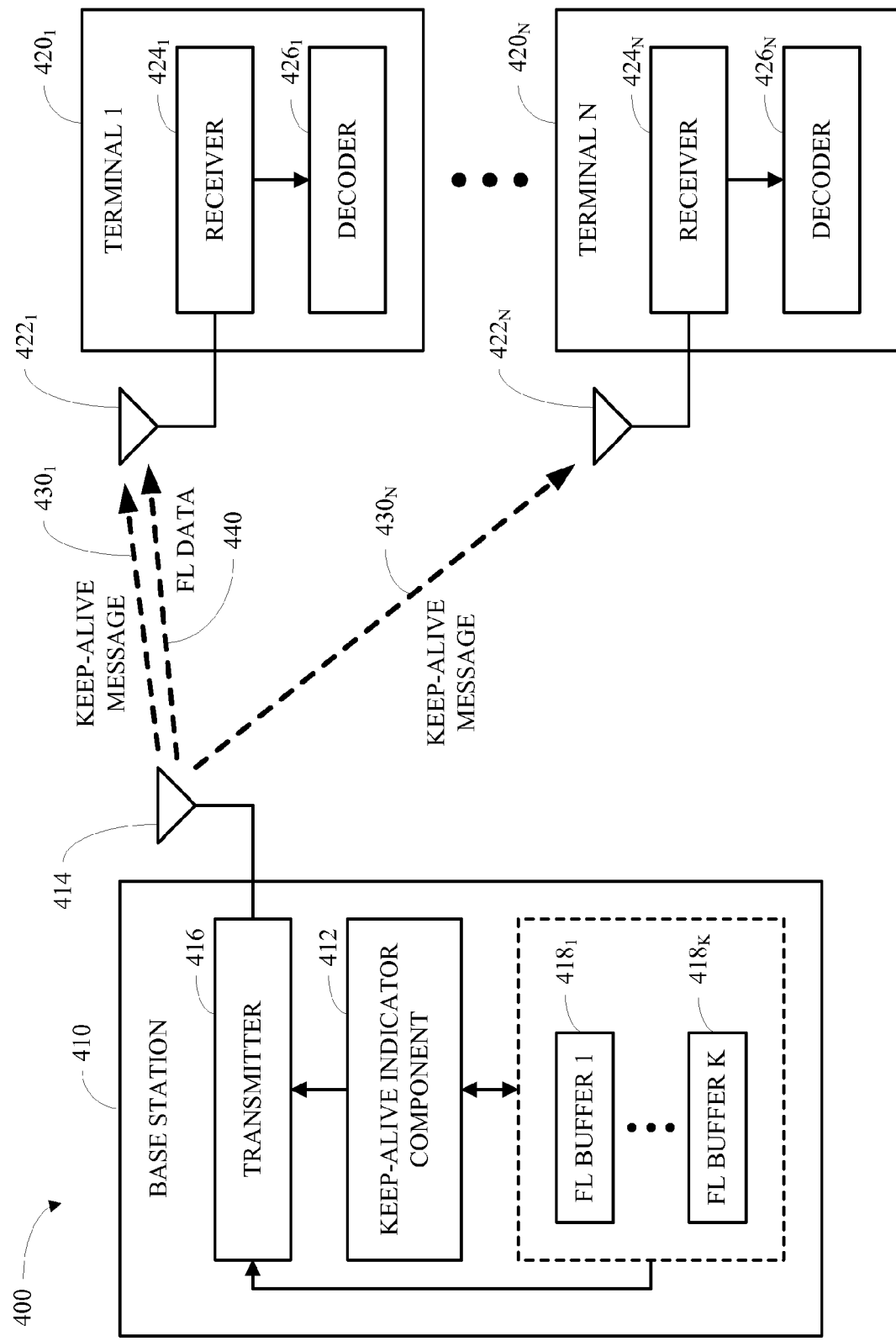
FIG. 4 is a block diagram of a system that facilitates forward link communication of data and keep-alive indications in accordance with various aspects.

FIG. 4 is a block diagram of a system 400 that facilitates forward link communication of data 440 and keep-alive indications 430 in accordance with various aspects. In one example, system 400 includes one or more base stations 410 that can communicate with one or more terminals 420 on a forward link (FL) and a reverse link (RL) via respective antennas 414 and 422. While only one antenna 414 is illustrated at base station 410 and one antenna 422 is illustrated at each terminal 420 in system 400 for brevity, it should be appreciated that base station 410 and terminals 420 can include any number of antennas. Further, it should be appreciated that system 400 can include any number of base stations 410 and/or terminals 420.

In one example, traffic data can be transmitted from base station 410 to terminals 420 on the forward link based on persistent assignments of communication resources for terminals 420. These assignments can be provided by base station 410 and/or another appropriate entity in system 400. In another example, data for transmission to terminals 420 can be stored by one or more forward link buffers 418 at base station 410. Forward link buffers 418 at base station 410 can be used to store data to be transmitted via the Radio Link Protocol (RLP) and/or any other appropriate communication protocol. Additionally and/or alternatively, forward link buffers 418 can respectively correspond to data channels on which base station 410 communicates pursuant to a persistent resource assignment for one or more terminals 420. As another example, a single common forward link buffer 418 can be used to store data for multiple terminals 420 and/or data channels, and an intended terminal 420 and/or data channel for transmission of a given packet or other unit of data can be indicated in a header and/or another portion of the data. In the event that a terminal 420 is assigned more than one data channel, data in a forward link buffer 418 corresponding to the terminal 420 can identify a channel to be used. Alternatively, base station 410 can determine an appropriate channel for transmission of the buffered data from the channels assigned to the terminal 420.

In accordance with one aspect, base station 410 can further include a keep-alive indicator component 412 that can provide keep-alive indications for data channels used for communication between base station 410 and terminals 420. In one example, keep-alive indicator component 412 can determine whether or not to generate a keep-alive indication for a given data channel by monitoring forward link buffer(s) 418 for data to be transmitted on the data channel. This determination can be made by, for example, checking whether data is present in forward link buffer(s) 418 for the data channel. Upon determining whether or not to provide a keep-alive indication for a given data channel, keep-alive indicator component 412 can then generate a value based on the determination. As a specific example, keep-alive indicator component can generate a 1-bit value by setting a sign of the bit based on whether or not a keep-alive indication is to be conveyed. The generated values can then be provided to transmitter 416 for transmission to terminals 420 as one or more keep-alive messages 430.

In one example, keep-alive messages 430 can be provided to terminals 420 in a common multicast or broadcast transmission from base station 410. Further, keep-alive messages 430 can be provided as a bitmap signal (e.g., using bitmap structure 300) that includes bitmap bits (e.g., bitmap bits 310) corresponding to data channels utilized by terminals 420. The bitmap signal can further include error checking bits (e.g., CRC bits 320) to ensure accuracy of the keep-alive indications provided in the bitmap bits. Keep-alive messages 430 can be transmitted to terminals 420 on a forward link shared control channel (e.g., F-SCCH) and/or any other appropriate frequency channel.

In another example, if data 440 intended for transmission to a terminal 420 is present at one or more forward link buffers 418 at base station 410, the data 440 can be provided as a unicast transmission to the terminal 420. Forward link data 440 transmitted from base station 410 to a terminal 420 can be provided at a common time period with a keep-alive message 430 or at a separate time period. Further, forward link data 440 can be transmitted as one or more data packets and/or as another suitable unit of data.

In accordance with another aspect, a terminal 420 can receive a keep-alive message 430 transmitted by base station 410 via a receiver 424. Upon receiving a keep-alive message 430, a terminal 420 can perform verification of the keep-alive message 430 by, for example, comparing CRC bits provided in the keep-alive message 430 to an expected sequence. If the keep-alive message 430 fails verification (e.g., if the CRC bits do not match an expected sequence), the keep-alive message 430 can be discarded by the terminal 420. The terminal 420 can then send a negative acknowledgement (NAK) of the keep-alive message 430, request re-transmission of the keep-alive message 430, and/or otherwise indicate a failure to properly receive the keep-alive message 430 to base station 410.

In one example, when a keep-alive message 430 is not successfully received by a terminal 420, the terminal 420 can enter a default state, in which the terminal 420 can assume either that data 440 has been transmitted to the terminal 420 or that no data 440 has been transmitted to the terminal 420. In accordance with one aspect, default states at terminals 420 can be used to save power overhead associated with keep-alive messages 430. For example, base station 410 can elect to not target keep-alive message power to terminals 420 with poor channel conditions. Such a transmission scheme can be useful, for example, when the number of terminals 420 on persistent assignments in system 400 is small. In another example, terminals 420 can utilize multiple hypothesis decoding for keep-alive messages 430. For instance, if a terminal 420 misses one instance of a keep-alive message 430, the terminal 420 can start demodulating a traffic packet under an assumption that data 440 has been transmitted to the terminal 420 while simultaneously demodulating another instance of a packet starting at a subsequent time period if a keep-alive message 430 received at the subsequent time period indicates a data transmission.

If the keep-alive message is successfully verified, the terminal 420 can then check a portion of the keep-alive message 430 corresponding to the terminal 420 and/or a data channel utilized by the terminal to determine whether a keep-alive indication has been provided. If the corresponding portion of the keep-alive message 430 includes a keep-alive indication, the terminal 420 can hold its current persistent assignment for data channel(s) and wait for a subsequent keep-alive message 430. On the other hand, if the corresponding portion of the keep-alive message does not include a keep-alive indication, the terminal 420 can attempt to receive one or more packets and/or other units of forward link data 440 from base station 410 via receiver 424. Upon receiving forward link data 440 from base station 410, terminal 420 can utilize a decoder 426 to decode the received data.

Figure 5:
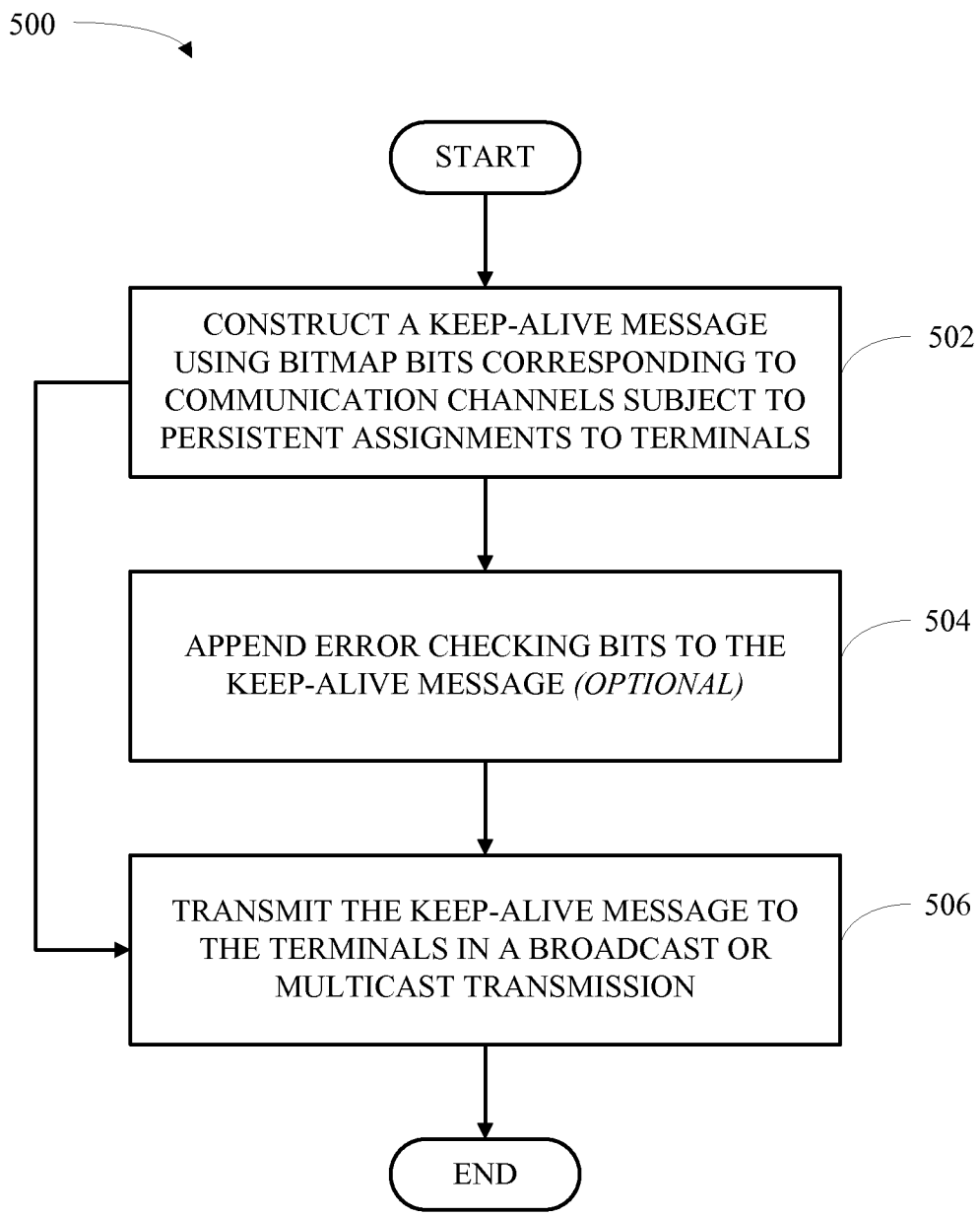
FIG. 5 is a flow diagram of a methodology for managing persistent assignments of communication resources in a wireless communication system.
Figure 6:
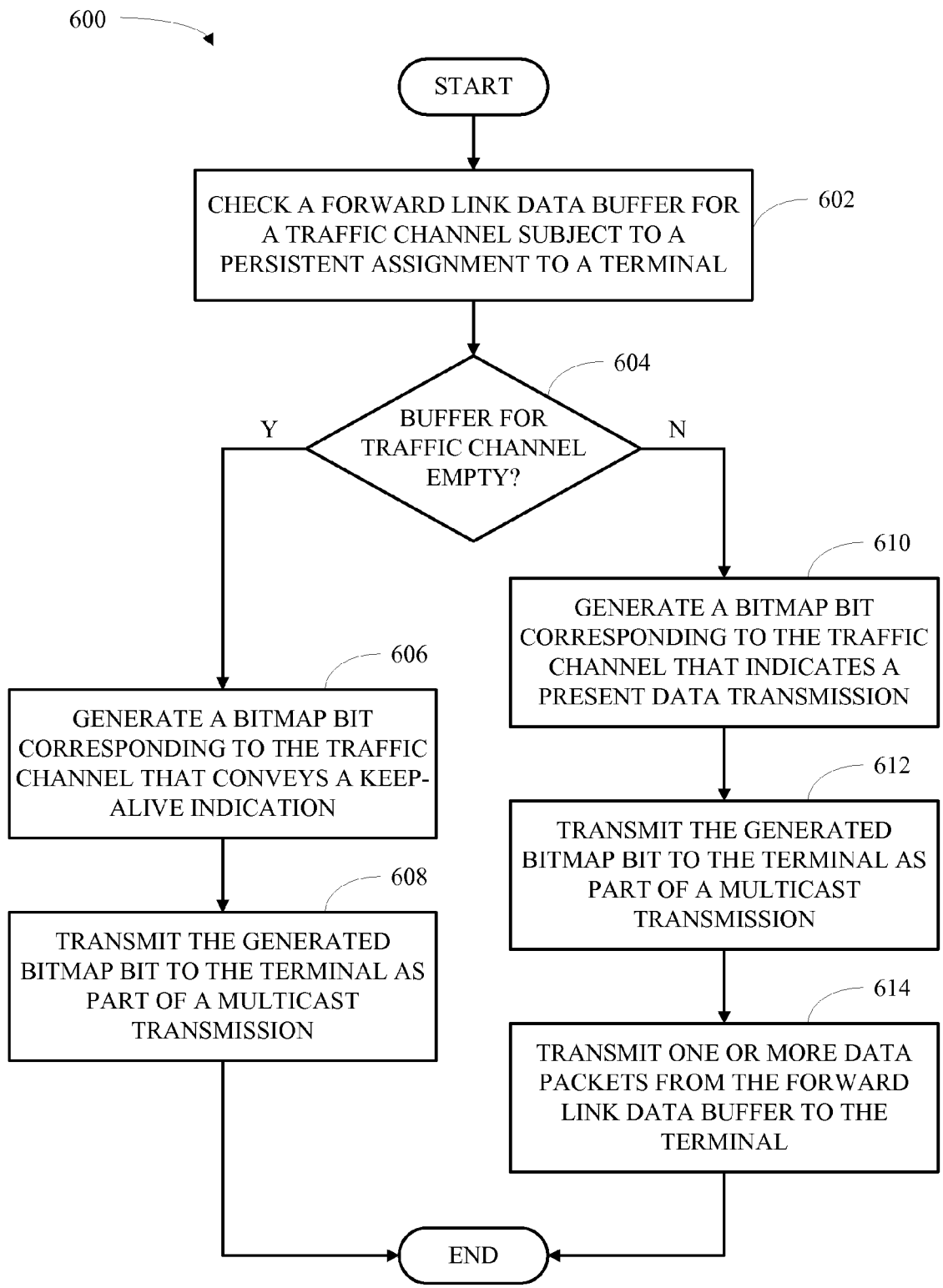
FIG. 6 is a flow diagram of a methodology for communicating keep-alive indications and data to a terminal in a wireless communication system.
Figure 7:
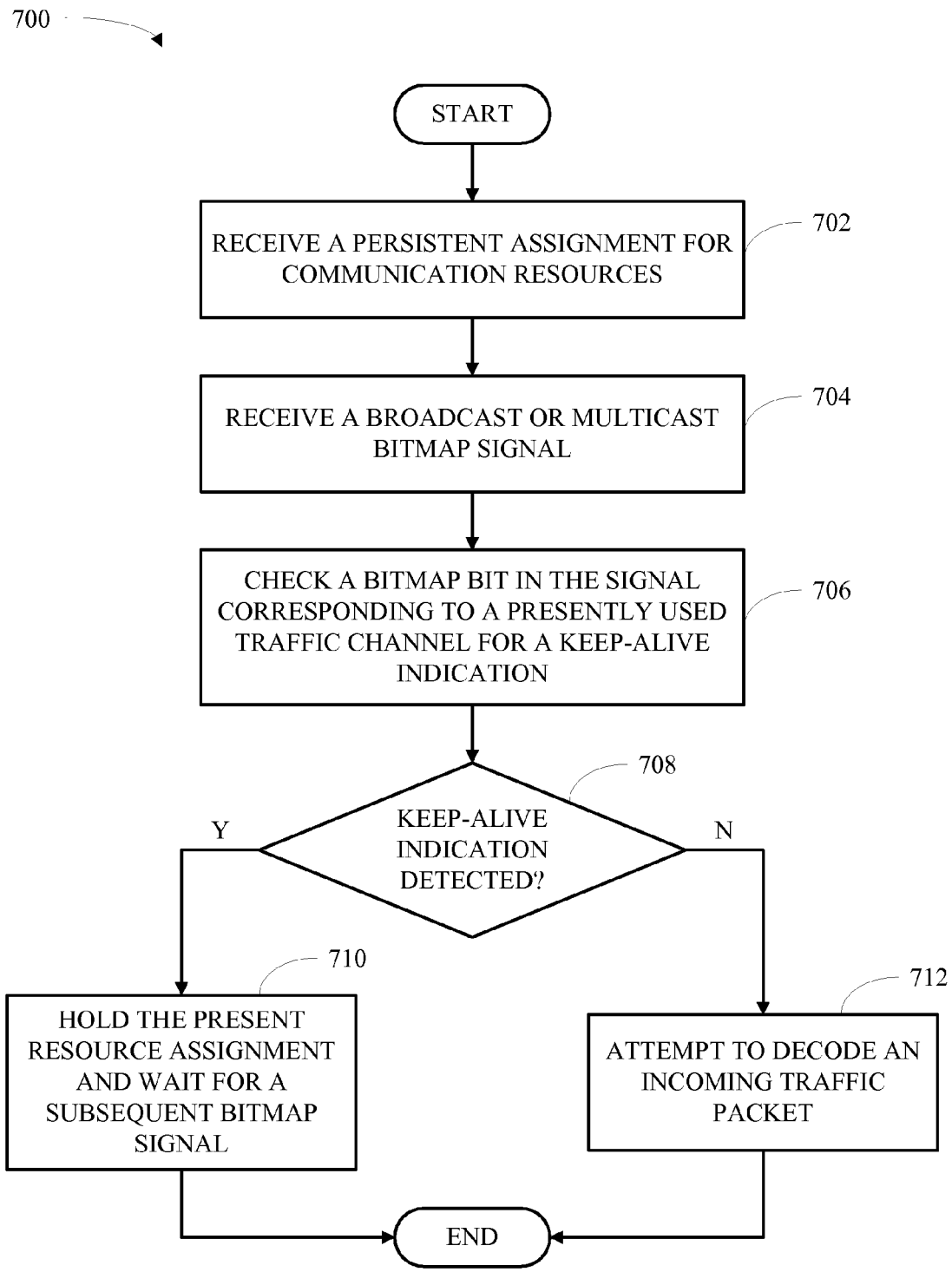
FIG. 7 is a flow diagram of a methodology for communicating using a persistent resource assignment in a wireless communication system.

Referring to FIGS. 5-7, methodologies for power and interference control in a wireless communication system are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 5, illustrated is a methodology 500 for managing persistent assignments of communication resources in a wireless communication system (e.g., system 200). It is to be appreciated that methodology 500 can be performed by, for example, an access point (e.g., access point 210) and/or any other appropriate network entity. Methodology 500 begins at block 502, wherein a keep-alive message (e.g., a keep-alive message 230) is constructed using bitmap bits (e.g., bitmap bits 310 in structure 300) corresponding to communication channels subject to persistent assignments to terminals (e.g., access terminals 220). The communication channels at block 502 can include, for example, data and/or signaling channels used by the terminals. Traffic channels assigned to the terminals can be utilized to communicate information such as voice, video, packet data, broadcast, messaging, and/or other suitable information.

In one example, one or more bitmap bits can be utilized for each channel at block 502. In another example, bitmap bits utilized at block 502 can indicate whether or not a keep-alive indication is to be conveyed to a terminal corresponding to one or more data channels. For example, if a buffer for a terminal having a persistent resource assignment is empty, a bitmap bit for one or more data channels used by the terminal can provide a keep-alive indication. The keep-alive indication can be provided by, for example, setting the sign of the bitmap bit to a predetermined value.

Upon completing the act described at block 502, methodology 500 can optionally proceed to block 504, wherein error checking bits (e.g., CRC bits 320) are appended to the keep-alive message. In one example, error checking bits can provide cyclic redundancy checking for keep-alive message. More particularly, if received error checking bits do not match an expected sequence, the keep-alive message can be regarded as erroneous and discarded. Appended error checking bits can have a fixed predetermined sequence, or alternatively they can be variable based on the bitmap bits. For example, the error checking bits can be generated by a CRC function and/or any other suitable operation on the bitmap bits.

After performing the acts described at block 502 and/or block 504, methodology 500 can then conclude at 506, wherein the keep-alive message constructed at blocks 502 and/or 504 is transmitted to the terminals in a broadcast or multicast transmission. The keep-alive message can be transmitted at block 506 using a shared control channel and/or any other appropriate communication resources. Further, the transmission at block 506 can be power controlled to ensure that terminals having a relatively low signal quality based on carrier-to-interference ratio and/or other signal quality metrics are able to receive the keep-alive message.

FIG. 6 illustrates a methodology 600 for communicating keep-alive indications and data to a terminal in a wireless communication system. It is to be appreciated that methodology 600 can be performed by, for example, an access point and/or any other appropriate network entity in a wireless communication system. Methodology 600 begins at block 602, wherein a check is performed of a forward link data buffer (e.g., a forward link buffer 418) for a traffic channel that is subject to a persistent assignment to a terminal (e.g., a terminal 420). A forward link data buffer checked at block 602 can be exclusive to a particular traffic channel or common to multiple traffic channels.

Next, at block 604, it is determined whether the forward link data buffer checked at block 602 is empty for the given traffic channel. If it is determined at block 604 that the buffer is empty for the traffic channel, methodology 600 proceeds to block 606, wherein a bitmap bit (e.g., a bitmap bit 310) corresponding to the traffic channel is generated that conveys a keep-alive indication. In one example, a bitmap bit generated at block 606 can be set to convey a keep-alive indication. Methodology 600 can then conclude at block 608, wherein the bitmap bit generated at block 606 is transmitted to a terminal to which the traffic channel is assigned as part of a multicast transmission. In one example, the transmission at block 608 can further include additional bitmap bits corresponding to other traffic channels utilized in the system and one or more bits for error checking and/or prevention (e.g., CRC bits 320). In addition, the transmission at block 608 can be communicated using a shared control channel (e.g., F-SCCH) and/or other suitable common communication resources. In another example, if a transmission made at block 608 is received erroneously by a terminal, the transmission can repeat as necessary to ensure proper transmission and reception of the bitmap bit generated at block 606.

On the other hand, if it is determined at block 604 that the buffer is not empty for the traffic channel, methodology 600 can instead proceed to block 610, wherein a bitmap bit corresponding to the traffic channel is generated that indicates a present data transmission. In one example, in contrast to a bitmap bit generated at block 606, a bitmap bit generated at block 610 can remain unset to indicate the presence of a data transmission. Alternatively, a bitmap bit generated at block 610 can be set to indicate a data transmission and a bitmap bit generated at block 606 can be left unset to indicate no data transmission and to convey a keep-alive indication. Next, at block 612, the bitmap bit generated at block 610 can be transmitted to a terminal to which the traffic channel is assigned as part of a multicast transmission. In one example, a transmission at block 612 can include additional bitmap bits and/or error checking bits and can be conducted in a similar manner to the transmission described at block 608. After transmitting the bitmap bit at block 612, methodology 600 can conclude at block 614, wherein one or more data packets (e.g., packets of FL data 440) stored by the forward link data buffer are transmitted to the terminal. The transmission of data at block 614 can be conducted at a common time period with the transmission at block 612 or at a subsequent time period. In one example, data packets can be communicated to the terminal at block 614 as a unicast transmission on the traffic channel utilized for the determination at block 604.

FIG. 7 illustrates a methodology 700 for communicating using a persistent resource assignment in a wireless communication system. It is to be appreciated that methodology 700 can be performed by, for example, a terminal (e.g., a terminal 420) and/or any other suitable network entity in a wireless communication system. Methodology 700 begins at block 702, wherein a persistent assignment for communication resources is received. In one example, the persistent assignment of resources can be an assignment for system bandwidth, which can be in the form of one or more subbands, subcarriers, frequency channels, and/or other appropriate units.

Next, at block 704, a multicast or broadcast bitmap signal (e.g., a keep-alive message 430) is received (e.g., from a base station 410). In one example, a bitmap signal received at block 704 can include bitmap bits (e.g., bitmap bits 310 in structure 300) that can correspond to channels and/or other resources assigned to an entity performing methodology 700 and/or other entities in the system. In another example, a bitmap signal received at block 704 can include error checking bits (e.g., CRC bits 320). In accordance with one aspect, an entity performing methodology 700 can utilize error checking bits provided in the bitmap signal at block 704 to determine whether the signal received at block 704 is correct. For example, it can be determined whether the error checking bits form an expected sequence. Upon detecting an error, the bitmap signal received at block 604 can be discarded, and/or a replacement signal can be requested.

Upon receiving a bitmap signal at block 704, methodology 700 can proceed to block 706, wherein a bitmap bit in the signal corresponding to a traffic channel presently used by the entity performing methodology 700 is checked for a keep-alive indication. Checking performed at block 706 can involve, for example, determining a sign of the relevant bitmap bit. At block 708, it is then determined whether a keep-alive indication is detected at the bit checked at block 706. In accordance with one aspect, if a keep-alive indication is detected at block 708, the entity performing methodology 700 can act according to the keep-alive indication. In particular, methodology 700 can conclude at step 710, wherein the resource assignment received at block 702 is held and the entity performing methodology 700 waits for a subsequent bitmap signal. Alternatively, if a keep-alive indication is not detected at block 708, the entity performing methodology 700 can assume that a transmission of data (e.g., FL data 440) is imminent and can act accordingly. Thus, methodology 700 can instead conclude at block 712, wherein the entity performing methodology 700 attempts to decode an incoming traffic packet.

Figure 8:
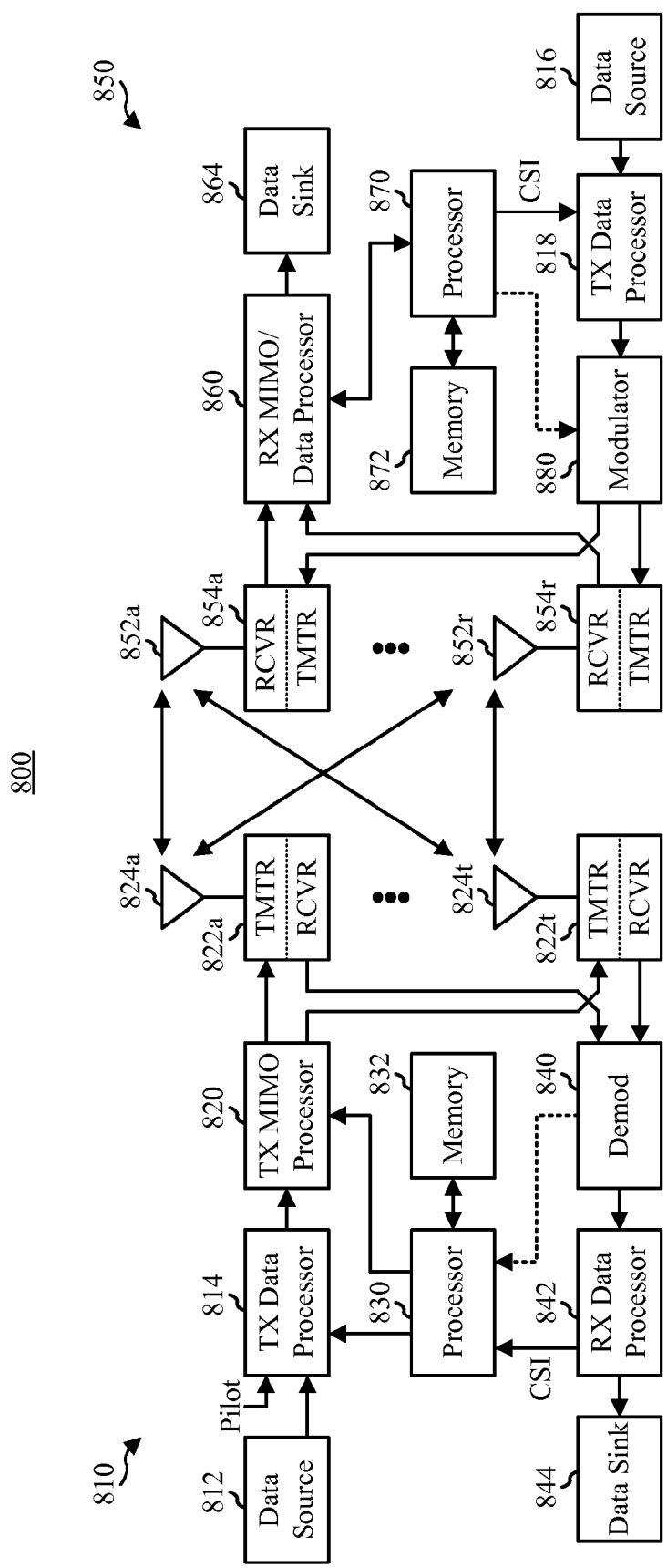
FIG. 8 is a block diagram illustrating an example wireless communication system in which one or more embodiments described herein may function.

Referring now to FIG. 8, a block diagram illustrating an example wireless communication system 800 in which one or more embodiments described herein can function is provided. In one example, system 800 is a multiple-input multiple-output (MIMO) system that includes a transmitter system 810 and a receiver system 850. It should be appreciated, however, that transmitter system 810 and/or receiver system 850 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 810 and/or receiver system 850 described herein could be utilized in connection with a single output to single input antenna system.

In accordance with one aspect, traffic data for a number of data streams are provided at transmitter system 810 from a data source 812 to a transmit (TX) data processor 814. In one example, each data stream can then be transmitted via a respective transmit antenna 824. Additionally, TX data processor 814 can format, code, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 850 to estimate channel response. Back at transmitter system 810, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 830.

Next, modulation symbols for all data streams can be provided to a TX processor 820, which can further process the modulation symbols (e.g., for OFDM). TX MIMO processor 820 can then provides NT modulation symbol streams to $N_T$ transmitters (TMTR) 822a through 822t. In one example, each transmitter 822 can receive and process a respective symbol stream to provide one or more analog signals. Each transmitter 822 can then further condition (e.g., amplify, filter, and upconvert) the analog signals to provide a modulated signal suitable for transmission over a MIMO channel. Accordingly, $N_T$ modulated signals from transmitters 822a through 822t can then be transmitted from $N_T$ antennas 824a through 824t, respectively.

In accordance with another aspect, the transmitted modulated signals can be received at receiver system 850 by $N_R$ antennas 852a through 852r. The received signal from each antenna 852 can then be provided to a respective receiver (RCVR) 854. In one example, each receiver 854 can condition (e.g., filter, amplify, and downconvert) a respective received signal, digitize the conditioned signal to provide samples, and then processes the samples to provide a corresponding "received" symbol stream. An RX MIMO/data processor 860 can then receive and process the $N_R$ received symbol streams from $N_R$ receivers 854 based on a particular receiver processing technique to provide $N_T$ "detected" symbol streams. In one example, each detected symbol stream can include symbols that are estimates of the modulation symbols transmitted for the corresponding data stream. RX processor 860 can then process each symbol stream at least in part by demodulating, deinterleaving, and decoding each detected symbol stream to recover traffic data for a corresponding data stream. Thus, the processing by RX data processor 818 can be complementary to that performed by TX MIMO processor 820 and TX data processor 814 at transmitter system 810.

In accordance with one aspect, the channel response estimate generated by RX processor 860 can be used to perform space/time processing at the receiver, adjust power levels, change modulation rates or schemes, and/or other appropriate actions. Additionally, RX processor 860 can further estimate channel characteristics such as, for example, signal-to-noise-and-interference ratios (SNRs) of the detected symbol streams. RX processor 860 can then provide estimated channel characteristics to a processor 870. In one example, RX processor 860 and/or processor 870 can further derive an estimate of the "operating" SNR for the system. Processor 870 can then provide channel state information (CSI), which can comprise information regarding the communication link and/or the received data stream. This information can include, for example, the operating SNR. The CSI can then be processed by a TX data processor 878, modulated by a modulator 880, conditioned by transmitters 854a through 854r, and transmitted back to transmitter system 810.

Back at transmitter system 810, the modulated signals from receiver system 850 can then be received by antennas 824, conditioned by receivers 822, demodulated by a demodulator 840, and processed by a RX data processor 842 to recover the CSI reported by receiver system 850. In one example, the reported CSI can then be provided to processor 830 and used to determine data rates as well as coding and modulation schemes to be used for one or more data streams. The determined coding and modulation schemes can then be provided to transmitters 822 for quantization and/or use in later transmissions to receiver system 850. Additionally and/or alternatively, the reported CSI can be used by processor 830 to generate various controls for TX data processor 814 and TX MIMO processor 820.

In one example, processor 830 at transmitter system 810 and processor 870 at receiver system 850 direct operation at their respective systems. Additionally, memory 832 at transmitter system 810 and memory 872 at receiver system 850 can provide storage for program codes and data used by processors 830 and 870, respectively. Further, at receiver system 850, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 9:
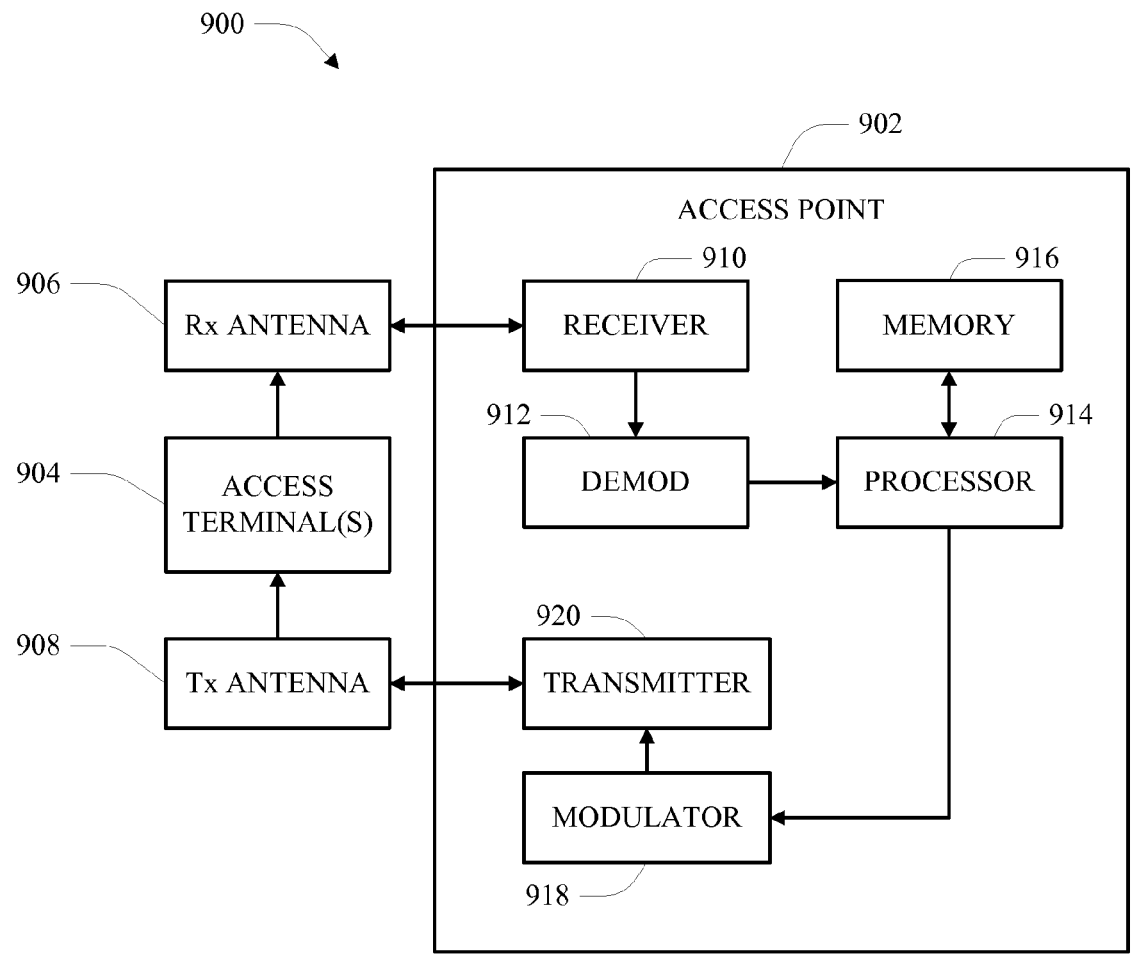
FIG. 9 is a block diagram of a system that manages assignments of transmission resources in accordance with various aspects.

FIG. 9 is a block diagram of a system 900 that manages assignments of transmission resources in a wireless communication system in accordance with various aspects described herein. In one example, system 900 includes a base station or access point 902. As illustrated, access point 902 can receive signal(s) from one or more access terminals 904 via a receive (Rx) antenna 906 and transmit to the one or more access terminals 904 via a transmit (Tx) antenna 908. Additionally, access point 902 can comprise a receiver 910 that receives information from receive antenna 906. In one example, the receiver 910 can be operatively associated with a demodulator (Demod) 912 that demodulates received information. Demodulated symbols can then be analyzed by a processor 914. Processor 914 can be coupled to memory 916, which can store information related to code clusters, access terminal assignments, lookup tables related thereto, unique scrambling sequences, and/or other suitable types of information. In one example, access point 902 can employ processor 914 to perform methodologies 500, 600, and/or other appropriate methodologies. Access point 902 can also include a modulator 918 that can multiplex a signal for transmission by a transmitter 920 through transmit antenna 908 to one or more access terminals 904.

Figure 10:
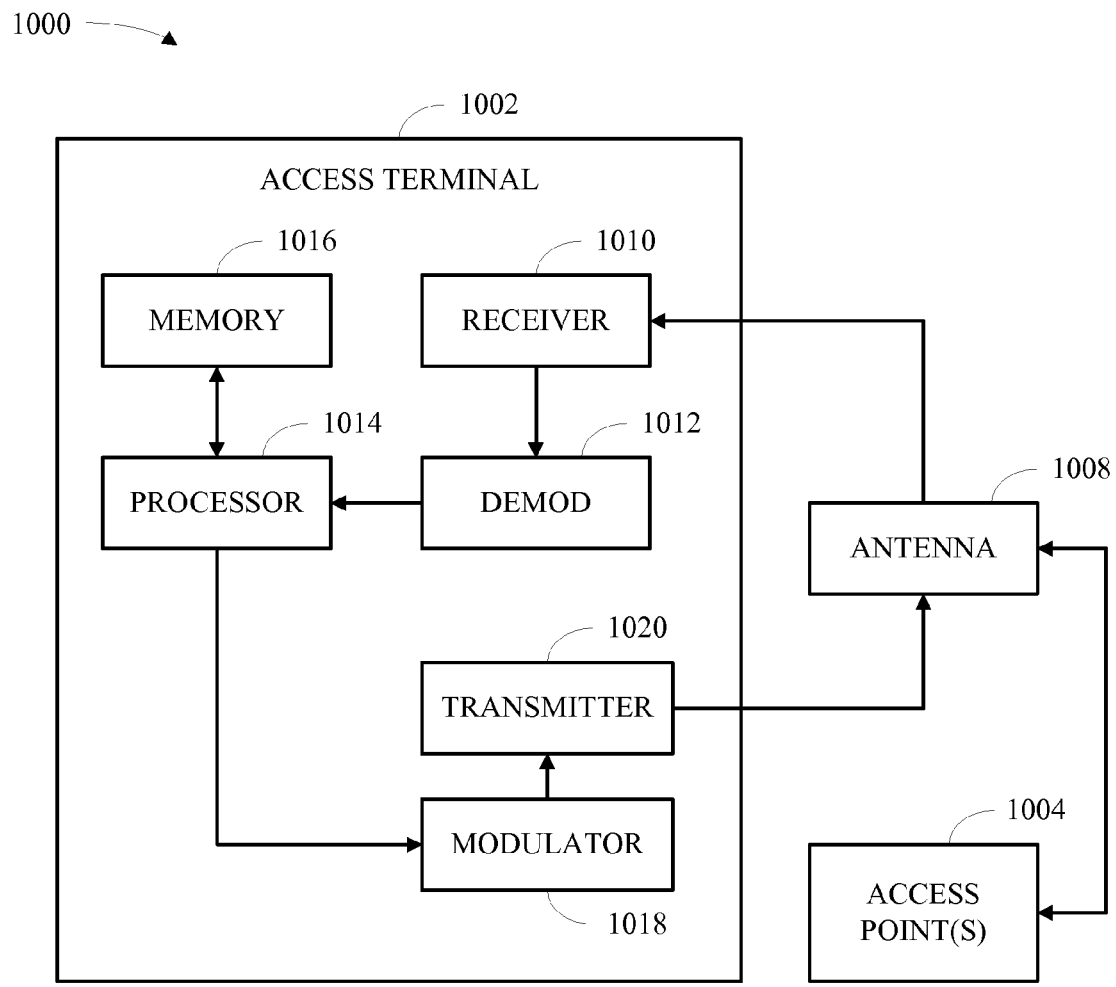
FIG. 10 is a block diagram of a system that coordinates communication based on a resource assignment in accordance with various aspects.

FIG. 10 is a block diagram of a system 1000 that coordinates communication based on a resource assignment in accordance with various aspects described herein. In one example, system 1000 includes an access terminal 1002. As illustrated, access terminal 1002 can receive signal(s) from one or more access points 1004 and transmit to the one or more access points 1004 via an antenna 1008. Additionally, access terminal 1002 can comprise a receiver 1010 that receives information from antenna 1008. In one example, receiver 1010 can be operatively associated with a demodulator (Demod) 1012 that demodulates received information. Demodulated symbols can then be analyzed by a processor 1014. Processor 1014 can be coupled to memory 1016, which can store data and/or program codes related to access terminal 1002. Additionally, access terminal 1002 can employ processor 1014 to perform methodology 700 and/or other appropriate methodologies. Access terminal 1002 can also include a modulator 1018 that can multiplex a signal for transmission by a transmitter 1020 via antenna 1008 to one or more access points 1004.

Figure 11:
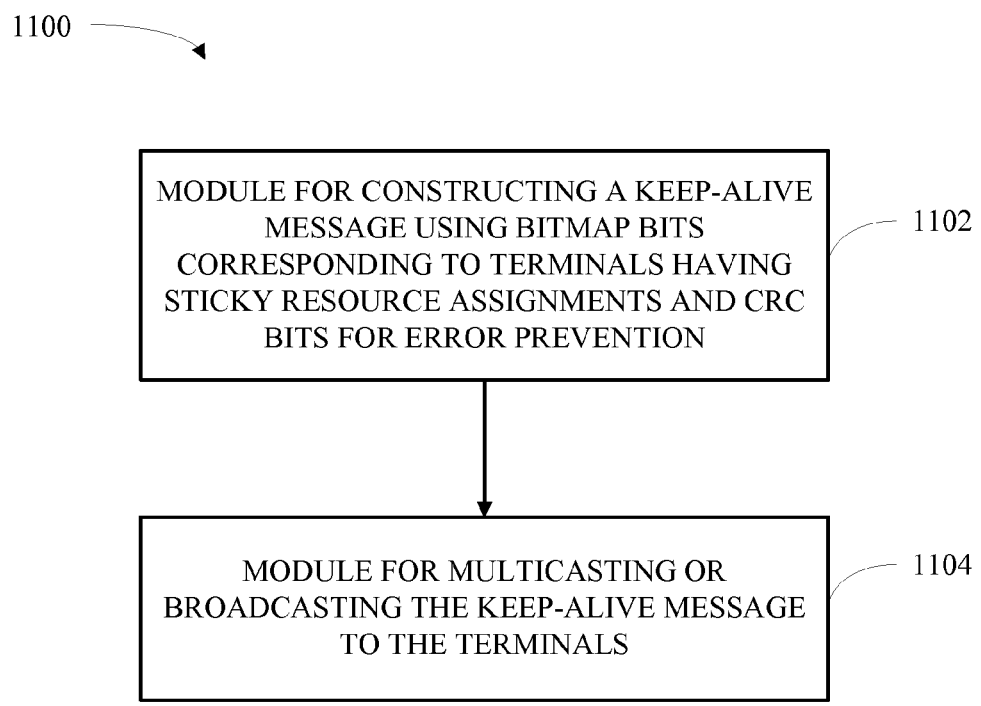
FIG. 11 is a block diagram of an apparatus that facilitates management of sticky resource assignments in a wireless communication system.

FIG. 11 illustrates an apparatus 1100 that facilitates management of sticky resource assignments in a wireless communication system (e.g., system 200). It is to be appreciated that apparatus 1100 is represented as including functional blocks, which can be functional blocks that represent functions implemented by a processor, software, or combination thereof (e.g., firmware). Apparatus 1100 can be implemented in a base station (e.g., access point 210) and/or another suitable network entity and can include a module 1102 for constructing a keep-alive message using bitmap bits corresponding to terminals having sticky resource assignments and CRC bits for error prevention. Further, apparatus 1100 can include a module 1104 for multicasting or broadcasting the keep-alive message to the terminals.

Figure 12:
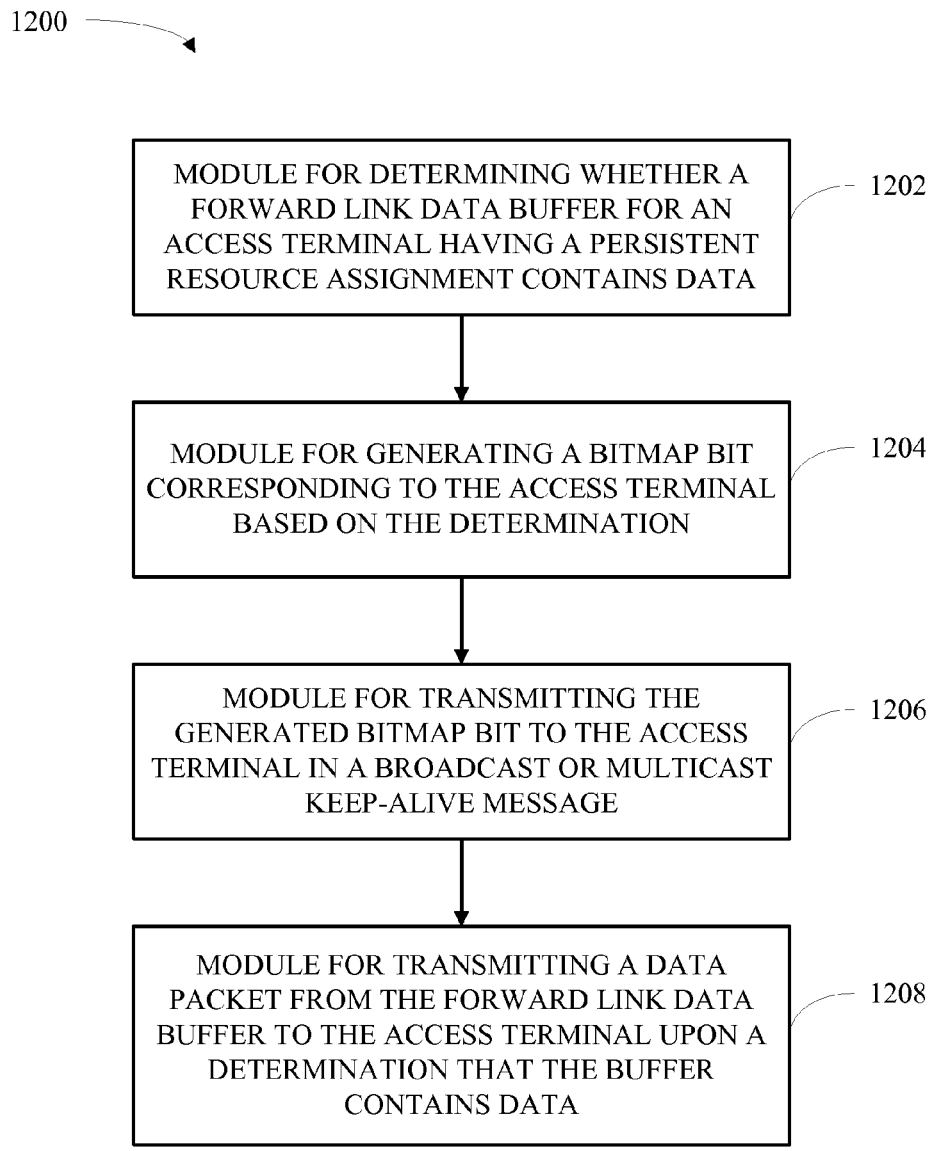
FIG. 12 is a block diagram of an apparatus that facilitates transmission of bitmap keep-alive messages and data packets in a wireless communication system.

FIG. 12 illustrates an apparatus 1200 that facilitates transmission of bitmap keep-alive messages and data packets in a wireless communication system. It is to be appreciated that apparatus 1200 is represented as including functional blocks, which can be functional blocks that represent functions implemented by a processor, software, or combination thereof (e.g., firmware). Apparatus 1200 can be implemented in a base station and/or another suitable network entity and can include a module 1202 for determining whether a forward link data buffer for an access terminal having a persistent resource assignment contains data. Further, apparatus 1200 can include a module 1204 for generating a bitmap bit corresponding to the access terminal based on the determination, a module 1206 for transmitting the generated bitmap bit to the access terminal in a broadcast or multicast keep-alive message, and a module 1208 for transmitting a data packet from the forward link data buffer to the access terminal upon a determination that the buffer contains data.

Figure 13:
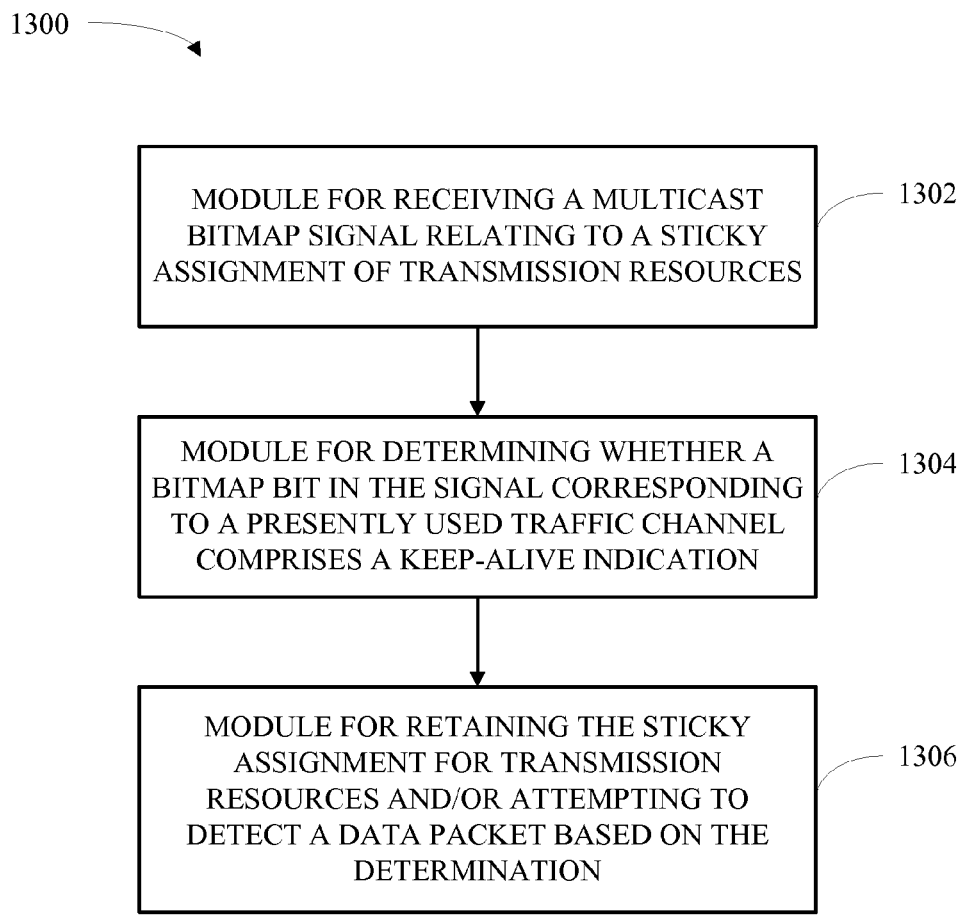
FIG. 13 is a block diagram of an apparatus that facilitates communication with an access point in a wireless communication system based on a sticky assignment of resources and a bitmap keep-alive signal.

FIG. 13 illustrates an apparatus 1300 that facilitates communication with an access point in a wireless communication system based on a sticky assignment of resources and a bitmap keep-alive signal. It is to be appreciated that apparatus 1300 is represented as including functional blocks, which can be functional blocks that represent functions implemented by a processor, software, or combination thereof (e.g., firmware). Apparatus 1300 can be implemented in a mobile terminal (e.g., a terminal 220) and/or another suitable network entity in a wireless communication system and can include a module 1302 for receiving a multicast bitmap signal relating to a sticky assignment of transmission resources. Further, apparatus 1300 can include a module 1304 for determining whether a bitmap bit in the signal corresponding to a presently used traffic channel comprises a keep-alive indication and a module 1306 for retaining the sticky assignment for transmission resources and/or attempting to detect a data packet based on the determination.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a non-transitory machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for communicating in a wireless communication system based on a persistent assignment of resources, comprising:
receiving from a base station a multicast bitmap signal relating to a persistent assignment for multiple presently utilized traffic channels, the multicast bitmap signal comprising one or more bitmap bits corresponding to respective traffic channels, wherein the multicast bitmap signal further comprises one or more CRC bits;
retrieving a bitmap bit in the bitmap signal corresponding to a presently utilized traffic channel;
checking the CRC bits to determine whether the multicast bitmap signal has been correctly received;
requesting re-transmission of the multicast bitmap signal upon a determination that the multicast bitmap signal has not been correctly received; and
operating according to a default state upon a determination that the multicast bitmap signal has not been correctly received,
wherein operating according to a default state comprises assuming that a bitmap bit in the multicast bitmap signal corresponding to a presently utilized traffic channel comprises a keep-alive indication.

2. The method of claim 1, further comprising determining whether the retrieved bitmap bit comprises a keep-alive indication.

3. The method of claim 2, further comprising waiting for a subsequent multicast bitmap signal upon determining that the retrieved bitmap bit comprises a keep-alive indication.

4. The method of claim 2, further comprising receiving one or more data packets on the presently utilized traffic channel upon determining that the retrieved bit does not comprise a keep-alive indication.

5. The method of claim 1, wherein the receiving a multicast bitmap signal includes receiving the multicast bitmap signal on a shared control channel.

6. The method of claim 1, further comprising discarding the multicast bitmap signal upon a determination that the multicast bitmap signal has not been correctly received.

7. A wireless communications apparatus, comprising:
   a memory that stores data relating to multiple persistently assigned traffic channels and a bitmap keep-alive message received from a base station, the bitmap keep-alive message comprising one or more bits that correspond to respective traffic channels;
   a processor configured to determine whether a bit in the bitmap keep-alive message corresponding to the persistently assigned traffic channel comprises a keep-alive indication; and
   request re-transmission of a new bitmap keep-alive message upon a determination that the bitmap keep-alive message is not accurate, wherein the processor is further configured to:
   receive from a base station a multicast bitmap signal relating to a persistent assignment for multiple presently utilized traffic channels, the multicast bitmap signal comprising one or more bitmap bits corresponding to respective traffic channels, wherein the multicast bitmap signal further comprises one or more CRC bits;
   check the CRC bits to determine whether the multicast bitmap signal has been correctly received;
   request re-transmission of the multicast bitmap signal upon a determination that the multicast bitmap signal has not been correctly received; and
   operate according to a default state upon a determination that the multicast bitmap signal has not been correctly received,
   wherein operating according to a default state comprises assuming that a bitmap bit in the multicast bitmap signal corresponding to a presently utilized traffic channel comprises a keep-alive indication.

8. The wireless communications apparatus of claim 7, wherein the processor is further configured to receive a transmission that includes the bitmap keep-alive message.

9. The wireless communications apparatus of claim 8, wherein the processor is further configured to retain the persistently assigned traffic channel and to wait for a subsequent transmission that includes a bitmap keep-alive message upon determining that the bit in the bitmap keep-alive message corresponding to the persistently assigned traffic channel comprises a keep-alive indication.

10. The wireless communications apparatus of claim 8, wherein the processor is further configured to retain the persistently assigned traffic channel and to attempt to receive traffic data on the persistently assigned traffic channel upon determining that the bit in the bitmap keep-alive message corresponding to the persistently assigned traffic channel does not comprise a keep-alive indication.

11. The wireless communications apparatus of claim 7, wherein the bitmap keep-alive message further comprises one or more error checking bits and the processor is further configured to determine whether the bitmap keep-alive message is accurate based at least in part on the error checking bits.

12. The wireless communications apparatus of claim 11, wherein the processor is further configured to discard the bitmap keep-alive message upon determining that the bitmap keep-alive message is not accurate.

13. An apparatus that facilitates wireless communication according to a sticky assignment of resources, comprising:
   means for receiving from a base station a keep-alive message comprising one or more bitmap bits corresponding to multiple respective traffic channels and one or more CRC bits;
   means for determining whether a bitmap bit in the keep-alive message corresponding to a traffic channel being presently utilized according to a sticky assignment conveys a keep-alive indication;
   means for requesting a new bitmap keep-alive message upon a determination that the bitmap keep-alive message is not accurate;
   means for receiving data on the traffic channel upon determining that a keep-alive indication has not been conveyed;
   means for receiving from a base station a multicast bitmap signal relating to a persistent assignment for multiple presently utilized traffic channels, the multicast bitmap signal comprising one or more bitmap bits corresponding to respective traffic channels, wherein the multicast bitmap signal further comprises one or more CRC bits;
   means for checking the CRC bits to determine whether the multicast bitmap signal has been correctly received;
   means for requesting re-transmission of the multicast bitmap signal upon a determination that the multicast bitmap signal has not been correctly received; and
   means for operating according to a default state upon a determination that the multicast bitmap signal has not been correctly received,
   wherein operating according to a default state comprises assuming that a bitmap bit in the multicast bitmap signal corresponding to a presently utilized traffic channel comprises a keep-alive indication.

14. A non-transitory computer-readable medium, comprising:
   code for causing a computer to receive information relating to a persistent assignment for a traffic channel;
   code for causing a computer to receive information from a base station relating to a multicast or broadcast bitmap signal that maps multiple traffic channels utilized by respective terminals to bitmap bits;
   code for causing a computer to determine whether the bitmap signal includes a keep-alive indication for the traffic channel;
   code for causing a computer to request a new bitmap keep-alive message upon a determination that the bitmap keep-alive message is not accurate;
   code for causing a computer, upon a positive determination, to wait for a subsequent multicast or broadcast bitmap signal;
   code for causing a computer, upon a negative determination, to attempt to receive one or more data packets on the traffic channel;
   code for causing a computer to receive from a base station a multicast bitmap signal relating to a persistent assignment for multiple presently utilized traffic channels, the multicast bitmap signal comprising one or more bitmap bits corresponding to respective traffic channels, wherein the multicast bitmap signal further comprises one or more CRC bits;
   code for causing a computer to check the CRC bits to determine whether the multicast bitmap signal has been correctly received;

code for causing a computer to request re-transmission of the multicast bitmap signal upon a determination that the multicast bitmap signal has not been correctly received; and code for causing a computer to operate according to a default state upon a determination that the multicast bitmap signal has not been correctly received, wherein operating according to a default state comprises assuming that a bitmap bit in the multicast bitmap signal corresponding to a presently utilized traffic channel comprises a keep-alive indication.

15. An integrated circuit that executes computer-executable instructions for utilizing keep-alive indications in a wireless communication system, the instructions comprising:

receiving a keep-alive message from an access point, the keep-alive message comprises keep-alive information corresponding to multiple traffic channels including a bit relating to a presently utilized traffic channel;

determining whether the keep-alive information relating to the presently utilized traffic channel conveys a keep-alive indication;

requesting a new bitmap keep-alive message upon a determination that the bitmap keep-alive message is not accurate;

at least one of receiving a data packet on the presently utilized traffic channel and continuing use of the presently utilized traffic channel pending a subsequent keep-alive message based on the determination;

receiving from a base station a multicast bitmap signal relating to a persistent assignment for multiple presently utilized traffic channels, the multicast bitmap signal comprising one or more bitmap bits corresponding to respective traffic channels, wherein the multicast bitmap signal further comprises one or more CRC bits;

checking the CRC bits to determine whether the multicast bitmap signal has been correctly received;

requesting re-transmission of the multicast bitmap signal upon a determination that the multicast bitmap signal has not been correctly received; and operating according to a default state upon a determination that the multicast bitmap signal has not been correctly received, wherein operating according to a default state comprises assuming that a bitmap bit in the multicast bitmap signal corresponding to a presently utilized traffic channel comprises a keep-alive indication.

* * * * *